Aug. 25, 1931.   C. H. CLEVELAND   1,820,268

LOCK RING

Filed July 11, 1929

INVENTOR
CHARLES H. CLEVELAND

ATTORNEYS

Patented Aug. 25, 1931

1,820,268

UNITED STATES PATENT OFFICE

CHARLES H. CLEVELAND, OF MINNEAPOLIS, MINNESOTA, ASSIGNOR OF ONE-THIRD TO CHARLES A. HEINE AND ONE-THIRD TO JOHN T. ALLISON, BOTH OF MINNEAPOLIS, MINNESOTA

LOCK RING

Application filed July 11, 1929. Serial No. 377,442.

This invention relates to an improved lock ring adapted to be inserted in an annular groove in a bearing to prevent or limit axial movement of a member supported therein.

An object of the invention is to provide a lock ring comprising a body portion adapted to be seated in an annular groove provided at one end of a bearing, and having its terminals bent inwardly and adapted for interlocking engagement to prevent the ring from accidentally becoming disengaged from the groove in which it may be seated.

A further object of the invention is to provide a lock ring having portions bent inwardly and adapted for interlocking engagement whereby an additive pressure is exerted on the body of the ring to hold it in the retaining groove, said portions also providing means whereby the lock ring may be grasped with a pair of pliers when inserting it in and removing it from the retaining groove.

Other objects of the invention are to provide a lock ring having means for positively preventing it from accidentally becoming disengaged from the retaining groove in which it may be seated; and to provide a lock ring having its terminals so shaped that when they are not interlocked with one another and are grasped by a pair of pliers, or other suitable instrument, the ring will contract or be sufficiently reduced in diameter to permit it to be readily inserted into and removed from the retaining groove.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
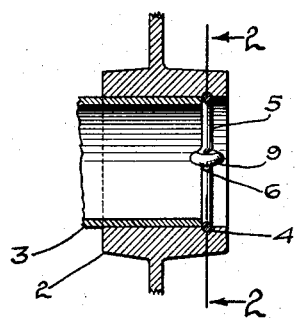
Figure 1 is a sectional view on the line 1—1 of Figure 2, showing a bearing with the lock ring mounted therein.
Figure 2:
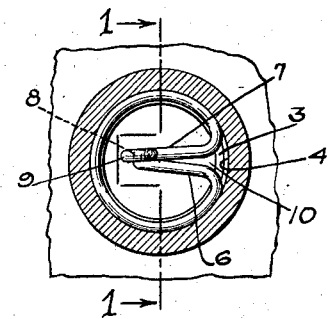
Figure 2 is a sectional view on the line 2—2 of Figure 1.

In the selected embodiment of the invention here shown, there is illustrated in Figures 1 and 2, for purposes of disclosure, a bearing 2 such, for example, as are commonly provided in a piston to support the wrist pin 3 therein. The bearing is here shown provided with an annular groove 4 adapted to receive the lock ring which will subsequently be described.

Figure 3:
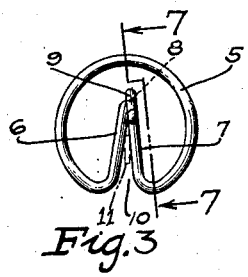
Figure 3 is a view showing the lock ring removed from the bearing and having its terminals interlocked.
Figure 4:
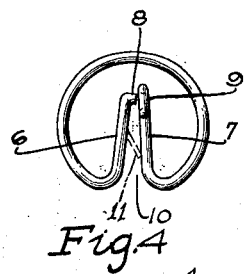
Figure 4 is a view similar to Figure 3, showing the terminals disengaged.

The novel lock ring featured in this invention comprises a body portion 5, substantially circular in configuration, and having end portions 6 and 7 bent inwardly, as best shown in Figures 3 to 6. The end portion 6 is provided with a terminal hook or detent 8 adapted to be received in a terminal eye 9 provided on the end portion 7. The end portions 6 and 7 are so shaped that when the detent 8 is engaged with the eye 9, an outward pressure is exerted on the ring portion 5, thereby firmly holding the ring in the groove 4, as shown in Figure 2, and preventing it from accidentally becoming disengaged therefrom while in use. A V-shaped gap 10 is also provided between the end portions 6 and 7, as shown in Figures 2, 3, and 4, to permit the insertion of a suitable tool 11 therebetween to spread apart the portions 6 and 7, as indicated by the dotted lines in Figure 4.

Figure 5:
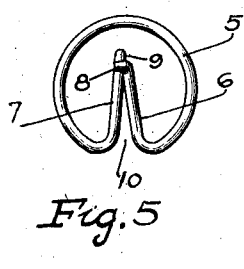
Figure 5 is a view showing the normal position of the terminals when not interlocked.

To remove the lock ring from the groove 4, the point of a screw driver or other suitable instrument is inserted in the V-shaped gap 10 and turned or slightly rotated, as shown in Figure 4, thereby causing the end portions 6 and 7 to spread sufficiently to permit the detent 8 to be moved out of engagement with the eye 9, as shown in Figure 5.

Figure 6:
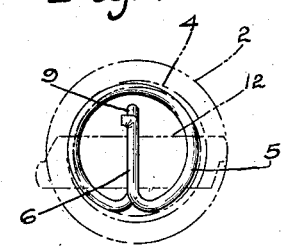
Figure 6 is a view showing the lock ring contracted.
Figure 7:
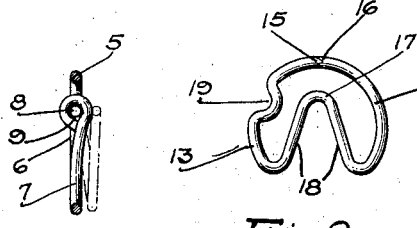
Figure 7 is a sectional view on the line 7—7 of Figure 3.

The end portions 6 and 7 may then be grasped by a pair of pliers, indicated by the dotted lines 12 in Figure 6, and moved inwardly as shown, thereby causing the body portion 5 of the ring to contract sufficiently to permit the ring to be readily removed from the groove 4. It will thus be seen that this novel lock ring may readily be removed from or inserted in the annular groove 4, by simply grasping the end portions 6 and 7 and contracting the ring as above described, after the detent 8 has been disengaged from the eye 9.

When the ring is inserted in a groove as shown in Figures 1 and 2, and the detent 8 is engaged with the eye 9, the ring cannot accidentally become disengaged from the groove because of the inherent outward pressure in the ring portion 5, as a result of the interlocking engagement of the end portions 6 and 7. This novel device therefore provides a lock ring well adapted for use in connection with engine pistons to retain the wrist pins in the bearings thereof. Obviously, the lock ring may be used in connection with other types of bearings or devices, where applicable.

Figure 8:
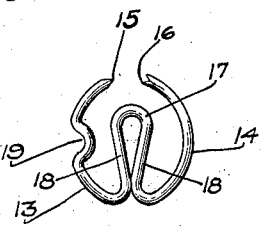
Figure 8 illustrates a lock ring of modified form in normal position.
Figure 9:
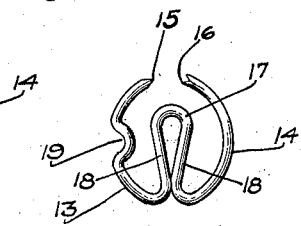
Figure 9 illustrates the ring shown in Figure 8, contracted.

Figures 8 and 9 illustrate a modified form of ring having legs 13 and 14 formed from a single piece of wire, and having terminals 15 and 16, respectively, adapted for interlocking engagement, as shown in Figure 8. The lower portions of the legs 13 and 14 are connected by a loop 17, located within the confines of the legs as shown in Figure 9. The connections 18 connecting the loop 17 with the legs 13 and 14 provide means whereby the ring may be contracted as shown in Figure 9, by simply bending the connections inwardly by means of a pair of pliers or other suitable instrument, thereby causing the effective ring diameter to be decreased sufficiently to permit the ring to be readily inserted into and removed from the annular groove 4, shown in Figures 1 and 2. A small inward depression 19 is provided in the leg 13, into which a suitable instrument may be inserted, when the ring is seated in the groove 4, to provide means for lifting the leg 13 out of the groove, after the terminals 15 and 16 have been separated by contracting the ring, as hereinbefore described, thereby facilitating the removal of the ring from the bearing groove.

I claim as my invention:

1. An expansion lock ring adapted for use in connection with a bearing having an annular groove in the bore thereof, said lock ring being formed from a single piece of wire shaped to provide a circular body portion adapted to be fitted into said annular groove to retain a member in the bearing, said body portion being open on one side to permit expansion and contraction of the ring, the end portions of the wire from which said lock ring is formed being bent inwardly and disposed within the confines of said body portion, and means whereby said end portions may be interlocked to retain the lock ring in the bearing groove.

2. An expansion lock ring adapted for use in connection with a bearing having an annular groove in the bore thereof, said lock ring being formed from wire and shaped to provide a circular body portion adapted to be fitted into the groove of said bearing, the end portions of the wire from which said body portion is formed being bent inwardly and spaced apart at the periphery of the ring, and means whereby said end portions may be interlocked when the ring is seated in said groove, whereby an outward force is exerted in said body portion to retain the ring in the bearing groove.

3. An expansion lock ring adapted for use in connection with a bearing having an annular groove in the bore thereof, said lock ring being formed from wire and shaped to provide a circular body portion adapted to be fitted into the groove of said bearing, the end portions of the wire from which said body portion is formed being bent inwardly and spaced apart at the periphery of the ring to permit the ring to be contracted for insertion into the groove, and the terminals of said inwardly bent end portions being provided with means whereby they may be interlocked, when the ring is seated in said groove, and whereby an outward force is exerted in said body portion to retain the ring in the bearing groove.

4. An expansion lock ring adapted for use in connection with a bearing having an annular groove in the bore thereof, said lock ring being formed from wire and shaped to provide a circular body portion adapted to be fitted into the groove in said bearing to retain a member therein, said ring having end portions bent inwardly and situated within the confines of the ring, an eye on one of said end portions and a detent on the other of said end portions, said eye and detent being adapted for interlocking engagement, when the ring is seated in said groove, whereby an outward force is exerted in the body of the ring to retain it in the bearing groove.

In witness whereof, I have hereunto set my hand this 2d day of July 1929.

CHARLES H. CLEVELAND.